United States Patent [19]

Chang et al.

[11] Patent Number: 5,464,928

[45] Date of Patent: Nov. 7, 1995

[54] DIRECT PROCESS FOR PREPARING SEMI-CRYSTALLINE POLYIMIDES

[75] Inventors: Alice C. Chang, Yorktown; Terry L. St. Clair, Poquoson, both of Va.

[73] Assignee: The United States of America as represented by the United States National Aeronautics and Space Administration, Washington, D.C.

[21] Appl. No.: 299,385

[22] Filed: Sep. 1, 1994

[51] Int. Cl.[6] ............................ C08G 73/10; C08G 69/26
[52] U.S. Cl. ........................ 528/353; 528/125; 528/128; 528/172; 528/173; 528/179; 528/183; 528/185; 528/188; 528/220; 528/229; 528/350; 528/351
[58] Field of Search ............................. 528/188, 125, 528/126, 128, 172, 173, 179, 183, 185, 220, 229, 350, 351, 353

[56] References Cited

U.S. PATENT DOCUMENTS 5,061,783  10/1991  St. Clair ................................ 528/188

5,147,966  9/1992  St. Clair et al. ...................... 528/188

FOREIGN PATENT DOCUMENTS

0459801A2  5/1991  European Pat. Off. .

*Primary Examiner*—P. Hampton-Hightower
*Attorney, Agent, or Firm*—George F. Helfrich; Joy L. Bryant

[57] ABSTRACT

The invention is a direct process for preparing semi-crystalline polyimides. This process comprises the steps of: providing a polar aprotic solvent, adding a dianhydride and a diamine to the solvent to form a mixture, stirring the mixture at ambient temperature, and adding glacial acetic acid to the mixture to provide a ratio of polar aprotic solvent to glacial acetic acid which ranges from about 90 to 10 to about 75 to 25 by volume to form a solution. The solution was heated to a range from about 110° C. to about 140° C. to form a polyimide precipitate. The polyimide precipitate was recovered as a semi-crystalline polyimide powder.

23 Claims, No Drawings

DIRECT PROCESS FOR PREPARING SEMI-CRYSTALLINE POLYIMIDES

ORIGIN OF THE INVENTION

The invention described herein was jointly made by an employee of the United States Government and in the performance of work under a NASA Contract and is subject to the provisions of Section 305 of the National Aeronautics and Space Act of 1958, as amended Public Law 85-568 (72 Stat. 435; 42 U.S.C. 2457).

CROSS-REFERENCE TO RELATED APPLICATIONS

This application is related to co-pending patent application Ser. No. 08/299,384, filed Sep. 1, 1994, entitled "A Solvent Resistant Copolyimide", and co-pending patent application Ser. No. 08/299,172, filed Aug. 31, 1994, entitled "Copolyimides Prepared from ODPA, BTDA and 3,4'-ODA".

BACKGROUND OF THE INVENTION

1. Field of the Invention

The present invention relates to a process for preparing polyimides. In particular, it relates to a direct process for preparing semi-crystalline polyimides.

2. Description of the Related Art

Typically, linear aromatic polyimides are prepared by reacting a dianhydride with a diamine in the presence of a polar aprotic solvent. The resulting product is a polyamic acid which is subsequently imidized to form a polyimide. Imidization can take place either through chemical dehydration or through the application of heat. The resulting polyimides have exceptional thermal and oxidative stabilities and are useful for such applications as adhesives, matrix resins for composites and molding powders.

Despite these properties, many of these polyimides are difficult to process into useful form because of their limited melt-flow properties. Most of the existing polyimides require processing temperatures approaching 400° C. and pressures near 10,000 psi in order to sinter to form a well consolidated part. Thus, in order for linear aromatic polyimides to be useful as adhesives, matrix resins and molding powders, it is desired that the polymers exhibit flow at lower temperatures and pressures.

St. Clair (U.S. Pat. No. 5,061,783) sought to achieve this through providing a two-part process for converting the polyamide-acid precursors of polyimides to polyimides which exhibit maximum levels of crystallinity, so that these crystalline forms can then be melted at relatively moderate temperatures to afford adequate flow for molding and consolidation operations. This process involves first dissolving a polyamide-acid in an amide solvent, or a mixture of an ether and an amide solvent, at low percent solids, followed by treating this solution with an aprotic organic base, such as triethylamine or pyridine. The polyamide-acid employed is the reaction product of 3,3',4,4'-benzophenonetetracarboxylic dianhydride and an aromatic diamine, especially 3,3'-diaminobenzophenone prepared in diglyme, or 4,4'-oxydianiline prepared in dimethyl acetamide, or 3,3'-diaminodiphenylsulfone prepared in diglyme. Finally, this solution is treated with an organic dehydrating agent. St. Clair found that the solubility of the resulting polyimide in the reaction mixture affects the resulting degree of crystallinity. Also, the time that the dehydrated polymer is in contact with the final solution affects the degree of crystallinity.

An object of the present invention is to provide a direct process for preparing semi-crystalline polyimides directly from a mixture of a dianhydride and a diamine.

Another object of the invention is to provide a direct process for preparing semi-crystalline polyimides which may be processed at temperatures just above their melting points.

Another object of the invention is to form finely divided polyimide particles directly from the reaction mixture.

SUMMARY OF THE INVENTION

By the present invention, the foregoing and additional objects are attained by providing a direct process for preparing semi-crystalline polyimides. This process comprises providing a polar aprotic solvent; adding a dianhydride and a diamine to the solvent to form a mixture; stirring the mixture at ambient temperature; adding glacial acetic acid to the mixture to provide a ratio of polar aprotic solvent to glacial acetic acid which ranges from about 90 to 10 to about 75 to 25 by volume to form a solution. The solution is then heated to a range from about 110° to about 140° C. to form a polyimide precipitate. The polyimide precipitate is recovered as a semi-crystalline polyimide powder.

In addition to the steps given above, the stoichiometry of the reaction may be offset in order to control the final molecular weight of the polyimide. When there is a molar deficiency in the dianhydride, a monofunctional aromatic anhydride, such as phthalic anhydride, may be added to the mixture or to the solution in order to compensate. Likewise, if there is a molar deficit in the diamine, a monofunctional aromatic amine may be added to the mixture or to the solution to compensate.

DESCRIPTION OF THE PREFERRED EMBODIMENTS

The process of the present invention requires the use of a polar aprotic solvent. Examples of this solvent include but are not limited to: N-methylpyrrolidinone(NMP), N,N-dimethyl acetamide (DMAc) and gammabutyrolactone (GBL). The preferred solvent is NMP.

A dianhydride and a diamine were added to the solvent to form a mixture. The process will work with any dianhydride but in particular those selected from the group consisting of: isophthaloyldiphthalic anhydride (IPDA), 3,3'4,4'-benzophenonetetracarboxylic dianhydride (BTDA) and 4,4'-oxydiphthalic anhydride (4,4'-ODPA). The most preferred dianhydride is 4,4'-ODPA. Similarly, any diamine may be employed in the process of the present invention but the preferred diamines include those selected from the group consisting of: m-phenylene diamine (m-PDA), 3,4'-oxydianiline (3,4'-ODA) and 3,3'-diaminodiphenylsulfone (3,3'-DDS). 3,4'-ODA is the most preferred diamine.

The stoichiometry for the mixture may be balanced or offset depending on the final desired molecular weight of the polyimide. By offsetting the stoichiometry, a molar deficit of up to about 5 mole percent may exist for either the dianhydride or the diamine. A molar deficit in the dianhydride was compensated for by adding up to about 10 mole percent of a monofunctional aromatic anhydride (endcapper) to the mixture. In a most preferred embodiment, up to about 10 mole percent of phthalic anhydride (PA endcapper) was added to the mixture to compensate for a molar deficit in the dianhydride. In a like manner, a molar deficit in the diamine is compensated for by adding up to about 10 mole percent of a monofunctional aromatic amine (endcapper) to the mixture. The monofunctional aromatic anhydride or amine may be added to either the mixture (prior to the addition of glacial acetic acid) or the solution (after the addition of glacial acetic acid). When the endcapper was added to the mixture, it was found that the mixture must first be stirred for one hour at ambient temperature prior to adding the endcapper. After the endcapper was added, the mixture had to be stirred for two more hours at ambient temperature prior to the addition of glacial acetic acid.

Glacial acetic acid (GAA) was added to the mixture to form a solution. The ratio of polar aprotic solvent to GAA ranges from about 90 to 10 to about 75 to 25 by volume. When the polyimides were prepared at a ratio of 50 to 50 or with the ratio in favor of the GAA (25 to 75) they were not semicrystalline, but instead, where amorphous. In a preferred embodiment, the ratio of polar aprotic solvent to GAA is 90 to 10 by volume. In a most preferred embodiment, NMP is selected as the polar aprotic solvent and GAA is added to provide a ratio of 90 to 10 (NMP to GAA) by volume. It was found that the GAA acts as both a dehydrating agent and as a non-solvent for the formation of the semi-crystalline polyimide.

When the stoichiometry was offset and the endcapper was added to the solution (after the addition of the GAA), favorable results were obtained when the solution was stirred for one hour at ambient temperature. After the monofunctional aromatic anhydride or amine was added to the solution, the solution was stirred for two more hours at ambient temperature prior to the application of heat.

In order for the polyimide to be formed, the solution was heated to a temperature ranging from about 110° C. to about 140° C. The addition of heat caused the formation of a polyimide precipitate. The preferred temperature for this reaction is about 120° C. It was observed that at this temperature, the polyimide began to precipitate from the solution after only one hour.

Once the reaction was complete, the polyimide precipitate was recovered as a semi-crystalline polyimide powder. Any method known to those skilled in the art may be employed in recovering the polyimide powder. An example of one method which was used to recover the polyimide involved collecting the precipitate by filtration, stirring it in hot ethanol for several hours and drying it under vacuum at a temperature of 180° C. overnight. Another method involved merely filtering the precipitate from the solution and allowing it to dry at ambient temperature under vacuum.

The following examples are merely illustrative of the invention and are intended to enable those skilled in the art to practice the invention in all of the embodiments flowing therefrom, and do not in any way limit the scope of the invention as defined by the claims. The results for examples 1–12 are summarized in Table 1.

EXAMPLES

Example 1

Isophthaloyldiphthalic anhydride (IPDA) (4.9626 g, 0.0116 mole, 3 mole percent stoichiometric offset) was added to a stirred solution of m-phenylene diamine (m-PDA) (1.2976 g, 0.012 mole)in a 50/50 (by volume) solvent mixture comprising NMP (17 ml) and GAA (17 ml) under a nitrogen atmosphere. The solids content was 15% by weight. The solution was stirred for one hour at ambient temperature. Phthalic anhydride (PA) (0.1066 g, 0.0007 mole, 6 mole percent) was added to the solution and stirring was continued at ambient temperature for two more hours. The solution was then heated to 120° C. and maintained at that temperature for three hours. It was observed that the polyimide began to precipitate from the solution after one hour at 120° C. The precipitated polyimide was collected by filtration, stirred in hot ethanol for two hours, and dried under vacuum at 180° C. overnight. An infrared spectrum showed that the imidization was complete. The polymer had a glass transition temperature (Tg) of 253.2° C. and the x-ray diffraction pattern showed that the polymer was amorphous.

Example 2

The procedure of example 1 was followed to prepare a polyimide from 3,3',4,4'-benzophenonetetracarboxylic dianhydride (BTDA) (3.1257 g, 0.0097 mole, 3 mole percent offset) and 3,3'-diaminodiphenylsulfone (DDS) (2.4830 g, 0.01 mole)in a 50/50 (by volume) solvent mixture of NMP (15 ml) and GAA (15 ml). Phthalic anhydride (0.0889 g, 0.0006 mole, 6 mole percent) was added to the solution as an endcapper. The resulting polyimide had a Tg of 262.3° C. The infrared spectrum showed that the imidization was complete and the x-ray diffraction pattern showed that the polyimide was amorphous.

Example 3

The procedure of example 1 was followed to prepare a polyimide from 4,4'-oxydiphthalic anhydride (ODPA) (3.0092 g, 0.0097 mole, 3 mole percent offset) and 3,4'-oxydianiline (3,4'-ODA) (2.0024 g, 0.01 mole)in a 50/50 (by volume) solvent mixture of NMP (15 ml) and GAA (15 ml). Phthalic anhydride (0.0889 g, 0.0006 mole, 6 mole percent) was added to the solution as an endcapper. The resulting polyimide had a Tg of 209.6° C. The infrared spectrum showed that the imidization was complete and the x-ray diffraction pattern showed that the polyimide was amorphous.

Example 4

The procedure of example 1 was followed to prepare a polyimide from ODPA (3.0092 g, 0.0097 mole, 3 mole percent offset) and 3,4'-ODA (2.0024 g, 0.01 mole) in a 75/25 (by volume) solvent mixture of NMP (21 ml) and GAA (6.8 ml). Phthalic anhydride (0.0889 g, 0.0006 mole, 6 mole percent) was added to the solution as an endcapper. The resulting polyimide had an enthalpy of 38.9 J/g, a melting temperature (Tm) of 290.2° C. and a Tg of 231.4° C. The x-ray diffraction pattern showed that the polyimide was semicrystalline.

Example 5

A polyimide was prepared by adding IPDA (12.7767 g, 0.0233 mole, 3 mole percent offset) to a mixture of m-PDA (2.5955 g, 0.024 mole)in NMP (53 ml) in the presence of a nitrogen atmosphere. The mixture was stirred at ambient temperature for one hour and phthalic anhydride (0.2559 g, 0.00173 mole, 7.2 mole percent) was added. The mixture was stirred for an additional two hours at ambient temperature. GAA (17 ml) was added to the mixture to yield a NMP to GAA ratio of 75 to 25 (by volume) and forming a solution. The solution was heated to 120° C. and the temperature was maintained for 10 hours. The polyimide precipitate was filtered from the solution. The resulting polyimide had a Tg of 248.5° C., a Tm of 299.9° C. and an enthalpy of 28.9 J/g.

The x-ray diffraction pattern indicated that the polyimide was semi-crystalline and the infrared spectrum showed that the imidization was complete.

Example 6

The procedure of example 5 was followed to prepare a polyimide from ODPA (24.0733 g, 0.0776 mole, 3 mole percent offset) and 3,4'-ODA (16.0194 g, 0.08 mole)in NMP (201 ml). Phthalic anhydride (0.7110 g, 0.0048 mole, 6 mole percent) was added to the mixture after it had stirred for one hour at ambient temperature. Stirring at ambient temperature was continued for two more hours after the addition of phthalic anhydride. GAA (22 ml) was added to the mixture to yield a NMP to GAA ratio of 90 to 10 (by volume) and the solution was heated to 120° C. and maintained at that temperature for 3 hours. The polyimide was recovered by filtration. The polyimide powder had a Tg of 234.1° C., a Tm of 298.9° C., and a melt viscosity of 6,431 poise at 350° C. The x-ray diffraction pattern indicated that the polyimide was semicrystalline.

Example 7

The procedure of example 6 was followed to prepare a polyimide where the stoichiometric offset was 2 mole percent for the ODPA and the phthalic anhydride endcapper was added at 4 mole percent. The ratio of NMP to GAA was maintained at 90 to 10 (by volume). The resulting polyimide had a Tg of 235.7° C. and a Tm of 300.5° C. A portion of the polyimide powder was dried at ambient temperature for 10 hours. The x-ray diffraction pattern showed that the polyimide was semi-crystalline.

Example 8

A polyimide was prepared by adding ODPA (57.081 g, 0.184 mole) to a mixture of 3,4'-ODA (40.0484 g, 0.2 mole) and NMP (400 ml). The mixture was stirred overnight under nitrogen at ambient temperature. GAA (130 ml) was added to the mixture to provide a NMP to GAA ratio of 75 to 25 (by volume) and the solution was heated to 120° C. for three hours. It was observed that the polyimide began to precipitate from the solution after the solution had been heated for two hours. The polyimide powder was recovered from the solution. The resulting polyimide powder had a Tg of 217.6° C., a Tm of 278.4° C. and the x-ray diffraction pattern showed that the polyimide was semi-crystalline.

Example 9

The procedure of example 8 was followed to prepare an anhydride terminated polyimide from IPDA (85.2688 g, 0.2 mole), m-PDA (20.5474g, 0.19 mole), NMP (436 ml) and GAA (167 ml) (NMP to GAA ratio was 75 to 25 by volume). The reaction time at 120° C. was 24 hours. The resulting polyimide had a Tg of 242.9° C. and the x-ray diffraction pattern showed that it was semi-crystalline.

Example 10

The procedure of example 4 was followed to prepare the same polyimide but DMAc was substituted for NMP as the solvent. The solvent ratio was 75 to 25 by volume (DMAc to GAA). All other variables and amounts remained the same. The polyimide powder had a Tg of 226.8° C., a Tm of 294.0° C. and an enthalpy of 39.4° J/g. The polyimide was semicrystalline as determined by x-ray diffraction.

Example 11

The procedure of example 7 was followed to prepare the same polyimide but the solvent NMP was replaced with DMAc. The solvent ratio was 90 to 10 by volume (DMAc to GAA). All other variables and amounts remained the same. The polyimide powder had a Tg of 230.8° C., a Tm of 297.8° C. and an enthalpy of 33.3 J/g. The polyimide was semi-crystalline as determined by x-ray diffraction.

Example 12

The procedure of example 6 was followed to prepare a polyimide having a 3 mole percent stoichiometric offset for the ODPA and 6 mole percent of phthalic anhydride endcapper. The NMP was replaced with gamma-butyrolactone (GBL) to provide a ratio of 90 to 10 by volume (GBL to GAA). The resulting polyimide powder had a Tg of 229.6° C., a Tm of 295.2° C. and an enthalpy of 33.2 J/g. The infrared spectrum showed that the imidization was complete and the x-ray diffraction pattern showed that the polyimide was semi-crystalline.

Example 13

Neat resin moldings were prepared from the polyimide powder of example 6. Ten grams of the polyimide were placed in a matched metal die mold. The mold was heated to 300° C. and maintained for 30 minutes at 0 psi. Next, the mold was pressurized to 1000 psi and the temperature was raised to 330° C. where it was held for 1.5 hours. The mold was then cooled to room temperature. The neat resin had a fracture toughness ($G_{1c}$) of 4956 J/m$^2$ at room temperature.

Example 14

Neat resin moldings were prepared from the polyimide powder of example 7. Ten grams of the polyimide were placed in a matched metal die mold. The mold was heated to 300° C. and maintained for 30 minutes at 0 psi. Next, the mold was pressurized to 1000 psi and the temperature was raised to 330° C. where it was held for 1.5 hours. The mold was then cooled to room temperature. The neat resin had a fracture toughness ($G_{1c}$) of 6860 J/m$^2$ at room temperature.

TABLE 1

| Example Number | Reaction Conditions | Tm(°C.) | Tg(°C.) | X-Ray Results |
| --- | --- | --- | --- | --- |
| 1 | 50% NMP/50% GAA, 3 mole % IPDA offset, 6 mole % PA endcap | No melt | 253.2 | Amorphous |
| 2 | 50% NMP/50% GAA, 3 mole % BTDA offset, 6 mole % PA endcap | No melt | 262.3 | Amorphous |
| 3 | 50% NMP/50% GAA, 3 mole % ODPA offset, | No melt | 209.6 | Amorphous |

TABLE 1-continued

| Example Number | Reaction Conditions | Tm(°C.) | Tg(°C.) | X-Ray Results |
|---|---|---|---|---|
| 4 | 75% NMP/25% GAA, 3 mole % ODPA offset, 6 mole % PA endcap | 290.6 | 231.4 | Semi-crystalline |
| 5 | 75% NMP/25% GAA, 3 mole % IPDA offset, 6 mole % PA endcap | 299.9 | 248.5 | Semi-crystalline |
| 6 | 90% NMP/10% GAA, 3 mole % ODPA offset, 7.2 mole % PA endcap | 298.9 | 234.1 | Semi-crystalline |
| 7 | 90% NMP/10% GAA, 2 mole % ODPA offset, 6 mole % PA endcap | 300.5 | 235.7 | Semi-crystalline |
| 8 | 75% NMP/25% GAA, 8 mole % ODPA offset, 4 mole % PA endcap | 278.4 | 217.8 | Semi-crystalline |
| 9 | 75% NMP/25% GAA, 8 mole % IPDA offset, No endcap | 264.0 | 242.9 | Semi-crystalline |
| 10 | 75% DMAc/25% GAA, 3 mole % ODPA offset, No endcap | 294.0 | 226.8 | Semi-crystalline |
| 11 | 90% DMAc/10% GAA, 2 mole % ODPA offset, 6 mole % PA endcap | 297.8 | 230.8 | Semi-crystalline |
| 12 | 90% GBL/10% GAA, 3 mole % ODPA offset, 4 mole % PA endcap | 295.2 | 229.6 | Semi-crystalline |
|  | 6 mole % PA endcap |  |  |  |

What is claimed is:

1. A direct process for preparing semi-crystalline polyimides, the process comprising the steps of:
   (a) providing a polar aprotic solvent;
   (b) adding a dianhydride and a diamine to the solvent to form a mixture;
   (c) stirring the mixture at ambient temperature;
   (d) adding glacial acetic acid to the mixture to provide a ratio of polar aprotic solvent to glacial acetic acid ranging from about 90 to 10 to about 75 to 25 by volume to form a solution;
   (e) heating the solution to a range from about 110° C. to about 140° C. to form a polyimide precipitate; and
   (f) recovering the polyimide precipitate as a semi-crystalline polyimide powder.

2. A direct process according to claim 1, wherein the polar aprotic solvent is selected from the group consisting of: N-methylpyrrolidinone, N,N-dimethyl acetamide and gamma-butyrolactone.

3. A direct process according to claim 2, wherein the polar aprotic solvent is N-methylpyrrolidinone.

4. A direct process according to claim 1, wherein the ratio of polar aprotic solvent to glacial acetic acid is 90 to 10 by volume.

5. A direct process according to claim 3, wherein the ratio of N-methylpyrrolidinone to glacial acetic acid is 90 to 10 by volume.

6. A direct process according to claim 1, wherein the dianhydride is selected from the group consisting of: isophthaloyldiphthalic anhydride, 3,3',4,4'-benzophenonetetracarboxylic dianyhydride and 4,4'-oxydiphthalic anhydride.

7. A direct process according to claim 6, wherein the dianhydride is 4,4'-oxydiphthalic anhydride.

8. A direct process according to claim 1, wherein the diamine is selected from the group consisting of: m-phenylene diamine, 3,4'-oxydianiline and 3,3'-diaminodiphenylsulfone.

9. A direct process according to claim 8, wherein the diamine is 3,4'-oxydianiline.

10. A direct process according to claim 1, wherein a monofunctional aromatic anhydride is added to the mixture to compensate for a molar deficit in the dianhydride.

11. A direct process according to claim 10, wherein the monofunctional aromatic anhydride is phthalic anhydride.

12. A direct process according to claim 10, wherein up to about 10 mole percent of the monofunctional aromatic anhydride is added to the mixture.

13. A direct process according to claim 11, wherein up to about 10 mole percent of phthalic anhydride is added to the mixture.

14. A direct process according to claim 1, wherein a monofunctional aromatic amine is added to the mixture to compensate for a molar deficit in the diamine.

15. A direct process according to claim 14, wherein up to about 10 mole percent of the monofunctional aromatic amine is added to the mixture.

16. A direct process according to claim 1, wherein a monofunctional aromatic anhydride is added to the solution to compensate for a molar deficit in the dianhydride.

17. A direct process according to claim 16, wherein the monofunctional aromatic anhydride is phthalic anhydride.

18. A direct process according to claim 16, wherein up to about 10 mole percent of the monofunctional aromatic anhydride is added to the solution.

19. A direct process according to claim 17, wherein up to about 10 mole percent of phthalic anhydride is added to the solution.

20. A direct process according to claim 1, wherein a monofunctional aromatic amine is added to the solution to compensate for a molar deficit in the diamine.

21. A direct process according to claim 20, wherein up to about 10 mole percent of the aromatic amine is added to the solution.

22. A direct process according to claim 1, wherein the stirred solution is heated to about 120° C. to form a polyimide precipitate.

23. A direct process according to claim 1, wherein the polar aprotic solvent is N-methylpyrrolidinone; the dianhydride is 4,4'-oxydiphthalic anhydride; the diamine is 3,4'-oxydianiline; phthalic anhydride is added to the mixture; the ratio of N-methylpyrrolidinone to glacial acetic acid is 90 to 10 by volume; and the solution is heated to 120° C.

* * * * *